United States Patent
Goh et al.

(10) Patent No.: US 9,632,971 B2
(45) Date of Patent: Apr. 25, 2017

(54) METHOD OF HANDLING TRANSMISSION IN DATA TRANSMISSION SYSTEM

(71) Applicant: Ralink Technology Corp., Hsinchu County (TW)

(72) Inventors: Cheok Yan Goh, Hsinchu (TW); Yu-Hsun Chen, Hsinchu County (TW); Mao-Lin Wu, Hsinchu County (TW); Chih-Chieh Chou, Taipei (TW); Ching-Hwa Yu, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 384 days.

(21) Appl. No.: 14/190,096

(22) Filed: Feb. 26, 2014

(65) Prior Publication Data
US 2014/0244872 A1 Aug. 28, 2014

Related U.S. Application Data

(60) Provisional application No. 61/769,959, filed on Feb. 27, 2013.

(51) Int. Cl.
*G06F 13/42* (2006.01)
*G06F 13/38* (2006.01)

(52) U.S. Cl.
CPC .......... *G06F 13/4286* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2012/0122559 A1* | 5/2012 | Kelly | G07F 17/322 463/25 |
| 2013/0318289 A1* | 11/2013 | Tomlin | G06F 3/061 711/103 |
| 2014/0019742 A1* | 1/2014 | Ma | G06F 13/4027 713/100 |

* cited by examiner

*Primary Examiner* — Scott Sun
(74) *Attorney, Agent, or Firm* — Winston Hsu; Scott Margo

(57) ABSTRACT

A method of handling transmission for a host in a data transmission system includes establishing a connection with a device of the data transmission system via a first frequency; receiving a negotiating information from the device; and re-establishing the connection with the device via a second frequency when the negotiating information reveals that the second frequency is available for the host to communicate with the device; wherein the second frequency is different than the first frequency.

12 Claims, 6 Drawing Sheets

METHOD OF HANDLING TRANSMISSION IN DATA TRANSMISSION SYSTEM

CROSS REFERENCE TO RELATED APPLICATIONS

This application claims the benefit of U.S. Provisional Application No. 61/769,959, which was filed on Feb. 27, 2013, the contents of which are incorporated herein by reference.

BACKGROUND

The present invention relates to a method of handling transmission in a data transmission system, and more particularly, to a method of handling transmission capable of dynamically changing a frequency for data transmission in a data transmission system.

Universal Serial Bus (USB) is a public interface standard for a personal computer to access peripheral devices. Recently, the application of USB has been extended to a large number of consumer electronics and mobile devices. As storage capacity and network speed enters the epoch of Gigabyte, however, the data connection between a computer and peripheral devices requires a higher transmission rate, and USB 2.0 with a highest speed of 480 Mb/S has difficulty in meeting the continuous growing requirement of access rate.

In order to meet the demands for higher data transmission, USB 3.0 made a debut in November, 2008. The USB 3.0 promises 5 Gb/s "Super Speed" data transfers. When operating in "Super Speed", the USB 3.0 adopts "full duplex" signaling over two differential pairs separating from non-super speed differential pairs. As a result, a USB 3.0 cable contains 2 wires for power and ground, 2 wires for non-super speed data, and 4 wires for super speed data, and a shield. In contrast, a USB 2.0 cable contains only one transmission pair for data. Apart from that, super speed establishes a communication pipe between the host and each device in a host-directed protocol, but USB 2.0 broadcasts packet traffic to all devices. Certainly, the USB 3.0 has many features different than the USB 2.0 and those differences are well known by those skilled in the art, and thus not elaborated on herein.

The USB 3.0 system is compatible with the USB 2.0 system. When the device is identified, the USB 3.0 system decides whether to run in super speed (SS) or high speed (HS). However, when the USB 3.0 system is running in super speed, a phase-locked loop (PLL) clock generator may generate a 5 GHz clock, which allows data to be transmitted in the super speed connection via a frequency of 2.5 GHz. However, this data transmission may generate a noise spectrum near 2.5 GHz, which may interfere with wireless communication such as IEEE 802.11b/g/n or Bluetooth. In such a condition, the wireless data communication is affected by the USB 3.0 data transmission. This may result in a drop in throughput on the wireless link.

SUMMARY

It is therefore an objective of the present invention to provide a method of handling transmission in a data transmission system capable of dynamically adjusting a frequency for data transmission in the data transmission system, in order to prevent wireless transmission from being interfered with the USB 3.0 data transmission.

A method of handling transmission for a host in a data transmission system comprises establishing a connection with a device of the data transmission system via a first frequency; receiving a negotiating information from the device; and re-establishing the connection with the device via a second frequency when the negotiating information reveals that the second frequency is available for the host to communicate with the device; wherein the second frequency is different than the first frequency.

A method of handling transmission for a device in a data transmission system comprises establishing a connection with a host of the data transmission system via a first frequency; transmitting a negotiating information to the host; and allowing the host to re-establish the connection via a second frequency when the host is required to re-establish the connection via the second frequency according to the negotiating information; wherein the second frequency is different than the first frequency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
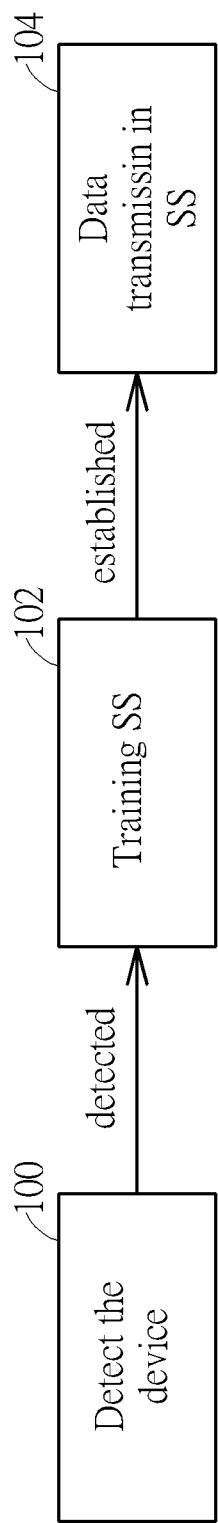
FIG. 1 is a schematic diagram of an identification flow of a super speed connection in a USB 3.0 system.

Please refer to FIG. 1, which is a schematic diagram of an identification flow of a super speed (SS) connection in a USB 3.0 system. As shown in FIG. 1, when a USB device is connected to a host of the USB 3.0 system, the host may detect whether the device is connected. If the device is detected (Step 100), the host then starts to establish a super speed connection with the device, and sends a training sequence to identify whether the device supports the super speed connection (Step 102). If the device has the capability of super speed data transmission, the device may reply corresponding information to the host. As a result, the super speed connection is established to transmit data in super speed (Step 104).

As mentioned above, when the super speed data is transmitted, a noise spectrum near 2.5 GHz may be generated and interfere with IEEE 802.11b/g/n communication signals, which usually utilizes 2.4 GHz frequency band for data communication. When the interference signals are detected, the present invention may change the data transmission frequency between the host and the device, in order to avoid the interference.

In an embodiment, when a degree of the interference signals is greater than a threshold, the host may notify the device. The degree of the interference signals may correspond to a number of interference signals with power greater than a specific power value detected in a specific period; that is, the host may notify the device if the number of interference signals with power greater than the specific power value exceeds the threshold, which represents that the number of interference signals which may interfere with the USB 3.0 data transmission is greater than the threshold. In another embodiment, the degree of the interference signals may correspond to a total power of the interference signals detected in a specific period; that is, the host may notify the device if the total power of interference signals is greater than a specific power value, which represents that the strength of interference power may be enough to influence the USB 3.0 data transmission.

Figure 2:
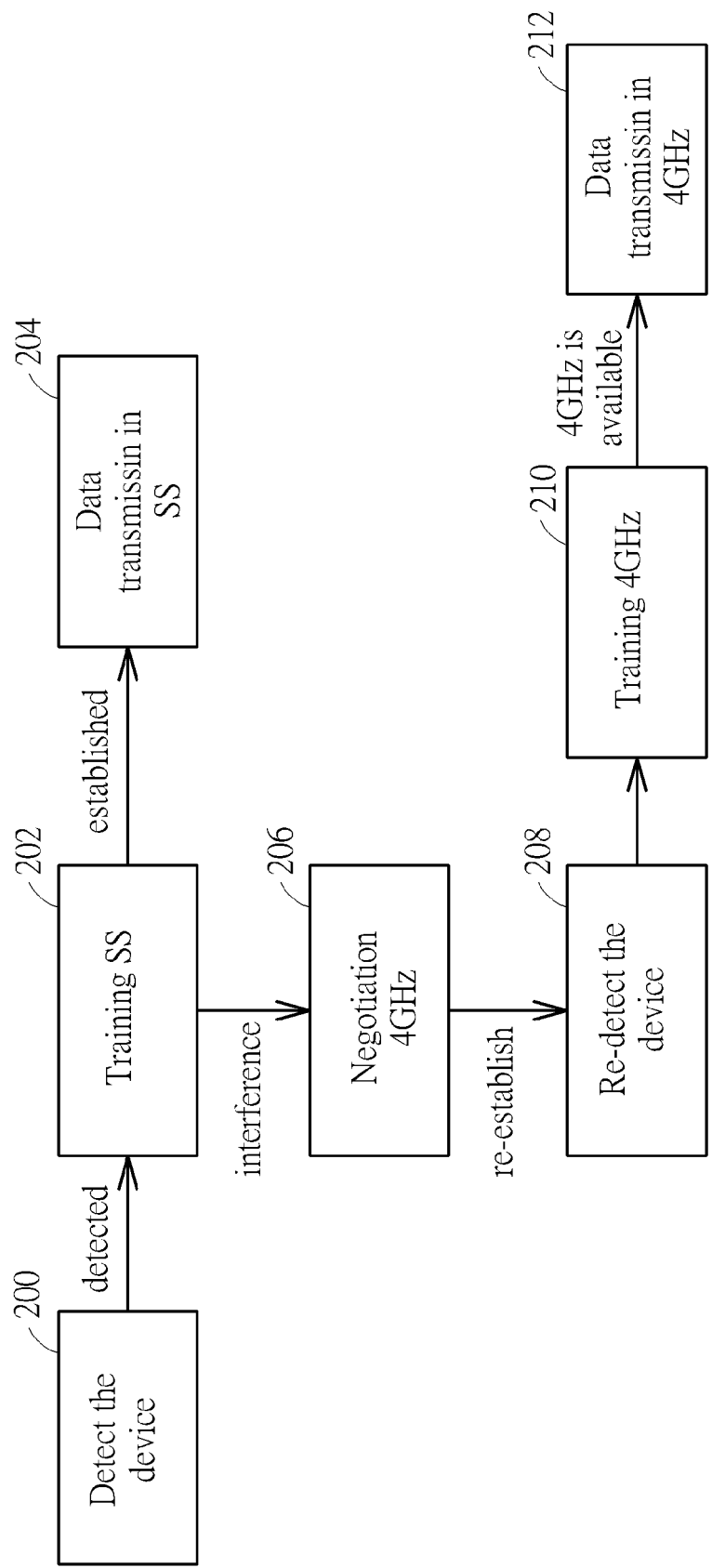
FIG. 2 is a schematic diagram of a modified identification flow when interference signals exist in a USB 3.0 system according to an embodiment of the present invention.

Please refer to FIG. 2, which is a schematic diagram of a modified identification flow when interference signals exist in a USB 3.0 system according to an embodiment of the present invention. As shown in FIG. 2, Steps 200-204 are similar to Steps 100-104, and will not be detailed herein. When the host discovers that the degree of the interference signals is greater than a threshold, the host may notify the device. After the device receives the notification, the device may negotiate with the host and transmit negotiating information related to frequency capability of the device (Step 206). In other words, the device may transmit negotiating information to the host, to inform the host the device has the ability to operate the data transmission in a frequency, e.g. 4 GHz, different to the normal super speed operating frequency defined by USB standard. After the host receives the negotiating information indicating that the device is able to operate in 4 GHz, the host may check whether it supports 4 GHz operating frequency. If the frequency 4 GHz is available for the host to communicate with the device, the host may re-establish the connection with the device via 4 GHz. The USB 3.0 data transmission via 4 GHz will not interfere with wireless communication signals such as IEEE 802.11b/g/n.

In an embodiment, the frequency 4 GHz may not be available for the host to communicate with the device. In such a condition, the host may notify the device. After the device receives the notification indicating that this frequency is not available for the host, the device may try to include another feasible operating frequency in another negotiating information and transmit the negotiating information to the host. Alternatively, the device may include a plurality of feasible operating frequencies in the negotiating information to allow the host to choose one of the feasible operating frequencies for the re-establishment.

In an embodiment, the device transmits the negotiating information during the training process. For example, the negotiating information may be carried in the training sequence to change information related to the frequency. In an embodiment, the negotiating information may be transmitted after data is transmitted. For example, the interference signals may be detected during data transmission. After the host detects the interference signals, the host then notifies the device to transmit the negotiating information. In such a condition, even if the connection is established successfully and data starts to be transmitted, the operating frequency can still be changed dynamically. In an embodiment, even if the connection has been re-established via a user-defined operating frequency such as 4 GHz, the connection may also be interfered with some other interference signals. In such a condition, the connection may further be re-established via another user-defined frequency such as 3 GHz.

Please keep referring to FIG. 2. When the normal super speed data transmission is interfered with wireless communication signals, the connection may be re-established via 4 GHz. At this moment, the super speed connection may be interrupted first, and the host then re-detects the device (Step 208) and sends the training sequence again to negotiate with the device via 4 GHz (Step 210). In other embodiments, the connection may be re-established by directly transferring the frequency to 4 GHz without additional negotiation or training. If the frequency 4 GHz is available for the host to communicate with the device, data can be transmitted in 4 GHz (Step 212).

Figure 3:
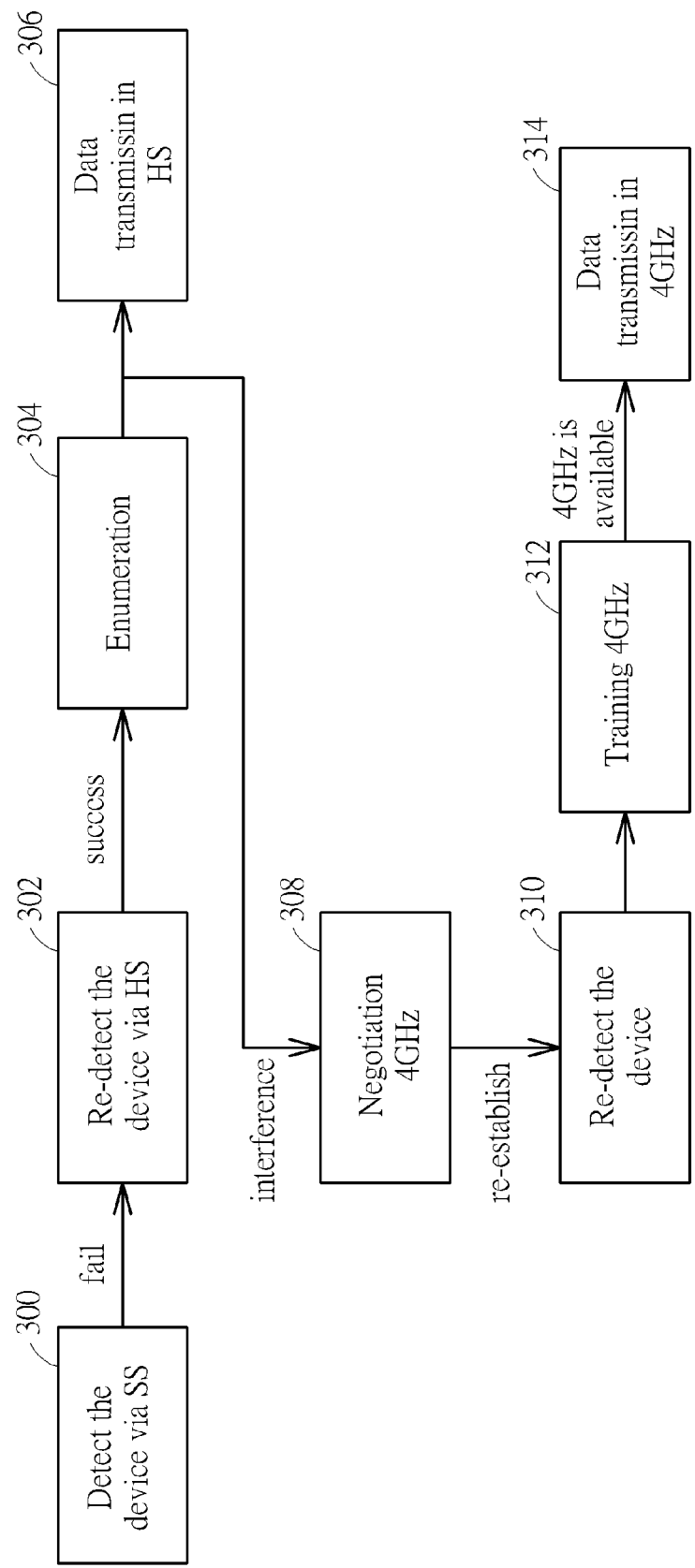
FIG. 3 is a schematic diagram of an identification flow of a high speed connection in a USB 3.0 system.

In an embodiment, the super speed connection may not be established successfully. For example, the interference signals may be too severe and interrupt the super speed connection, or the device may not have the capability of super speed data transmission. In such a condition, the USB system may start a high speed (HS) connection establishment. Please refer to FIG. 3, which is a schematic diagram of an identification flow of a high speed connection in a USB 3.0 system. As shown in FIG. 3, the host first detects the device via the super speed operating frequency (Step 300). If the host fails to detect the device via the super speed operating frequency, the host may re-detect the device via the high speed operating frequency (Step 302). If the host successfully re-detects the device, the host then performs enumeration to get a descriptor of the device (Step 304); hence, data can be transmitted in high speed (Step 306).

If the high speed operating frequency is interfered with wireless communication signals, the connection may also be re-established via another frequency. For example, after enumeration is performed, the device may transmit the negotiating information indicating that the device can operate the data transmission in a frequency, e.g. 4 GHz, different to the normal high speed operating frequency (Step 308). After the host receives the negotiating information which indicates that the device is able to operate in 4 GHz, the host may check whether it supports 4 GHz operating frequency. If the frequency 4 GHz is available for the host to communicate with the device, the host may re-establish the connection with the device via 4 GHz. Please note that, even if the device cannot support normal super speed operating frequency (5 GHz), the device may still support a user-defined operating frequency such as 4 GHz.

As shown in FIG. 3, the high speed connection may also be interrupted first, and the host then re-detects the device (Step 310) and sends the training sequence again to negotiate with the device via 4 GHz (Step 312). Therefore, data can be transmitted in 4 GHz (Step 314). As mentioned above, this connection may also be re-established by directly transferring the frequency to 4 GHz without additional negotiation or training.

Please note that the present invention provides a method of dynamically changing the operating frequency in a data transmission system, which can be any types of wired or wireless data communication system, and is not limited to the abovementioned USB 3.0 system. In general, when a lower frequency is available for both the host and the device and is kept away from interference signals, the data transmission may be performed via the lower frequency, which further possesses an advantage of lower power consumption. Therefore, the operating frequency of the data transmission system is preferably reduced to possess the benefits of both lower power consumption and less interference. This feature is distinct from typical communication technologies seeking for higher operating frequency and higher transmission rate. In addition, the method of dynamically changing the operating frequency can be performed in any states of the data transmission or in any ways, which is not limited herein.

Figure 4:
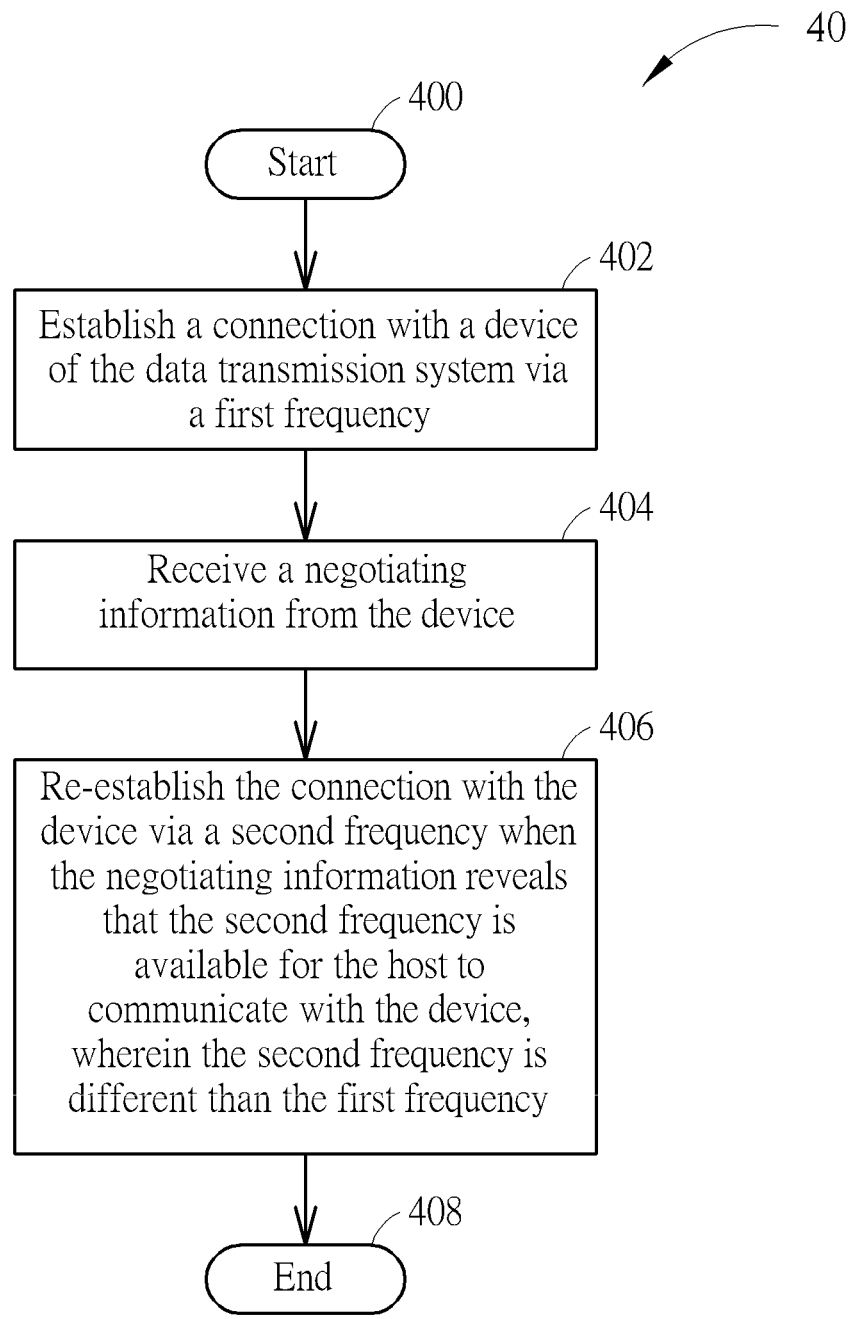
FIG. 4 is a schematic diagram of a process for the host according to an embodiment of the present invention.

The abovementioned operations of dynamically changing frequency for data transmission in a data transmission system can be summarized into processes for both the host and the device. For the host, a process 40 is shown in FIG. 4 and includes the following steps:

Step 400: Start.

Step 402: Establish a connection with a device of the data transmission system via a first frequency.

Step 404: Receive a negotiating information from the device.

Step 406: Re-establish the connection with the device via a second frequency when the negotiating information reveals that the second frequency is available for the host to communicate with the device, wherein the second frequency is different than the first frequency.

Step 408: End.

Figure 5:
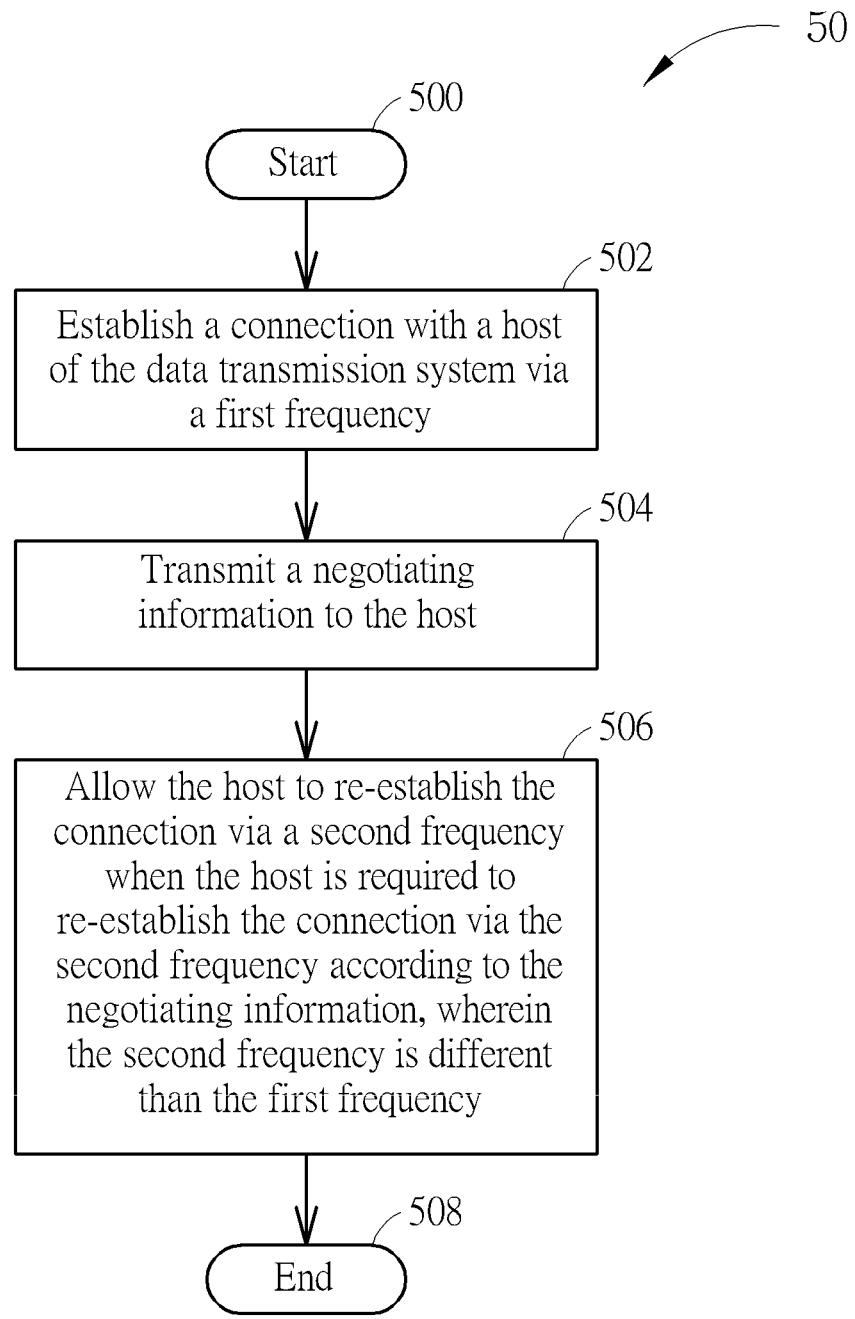
FIG. 5 is a schematic diagram of a process for the device according to an embodiment of the present invention.

The operation of dynamically changing frequency for the device is summarized into a process 50, which is shown in FIG. 5 and includes the following steps:

Step 500: Start.

Step 502: Establish a connection with a host of the data transmission system via a first frequency.

Step 504: Transmit a negotiating information to the host.

Step 506: Allow the host to re-establish the connection via a second frequency when the host is required to re-establish the connection via the second frequency according to the negotiating information, wherein the second frequency is different than the first frequency.

Step 508: End.

In the prior art, when the USB 3.0 system is running in super speed, the data transmission may generate a noise spectrum near 2.5 GHz, which may interfere with wireless communication such as IEEE 802.11b/g/n or Bluetooth. Therefore, the wireless data communication is affected by the USB 3.0 data transmission. This may result in a drop in throughput on the wireless link. In comparison, the present invention provides a method of dynamically changing operating frequency for data transmission in a data transmission system. The connection can be established in any frequency available for the host and the device. The user-defined frequency may be lower than the standard frequency so that the data transmission system can enjoy the benefits of both lower power consumption and lower interference.

Figure 6:
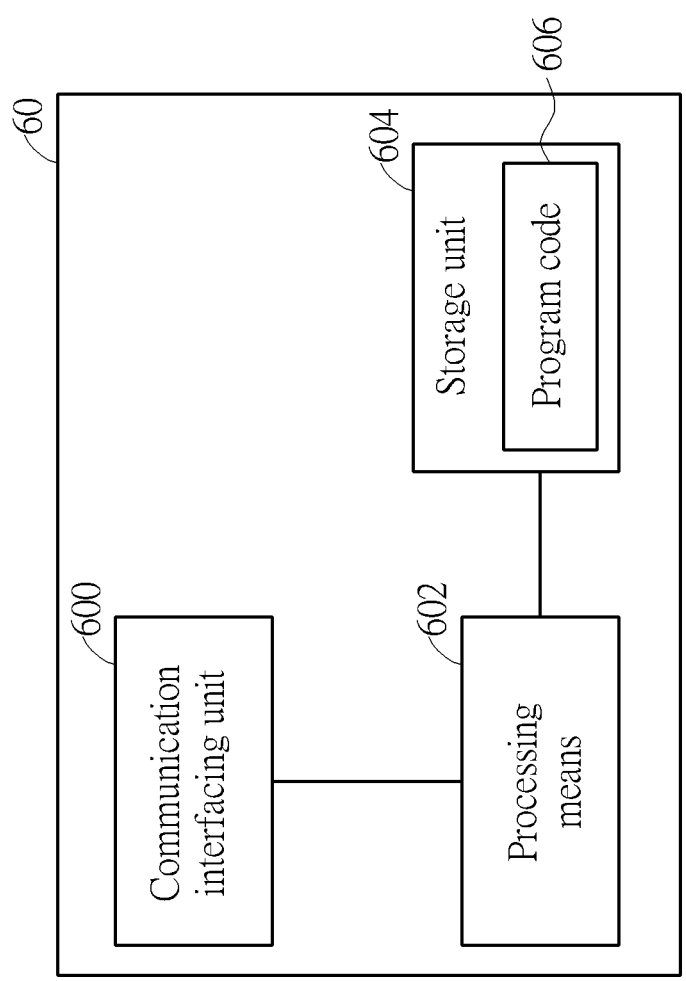
FIG. 6 is a schematic diagram of a communication apparatus according to an embodiment of the present invention.

In addition, each step of the processes 40 and 50 may be compiled into corresponding program code to implement the processes 40 and 50 in a host and a device of a data transmission system. Please refer to FIG. 6, which is a schematic diagram of a communication apparatus 60 according to an example of the present invention. The communication apparatus 60 may be the host or the device, and includes a communication interfacing unit 600, a processing means 602, a storage unit 604, and a program code 606. The program code 606 is stored in the storage unit 604, and can be used for implementing the process 40 or 50 by indicating the processing means 602 to perform operations corresponding to the process 40 or 50. Implementing the processes 40 or 50 through the program code 606 should be well-known to those skilled in the art, and is not detailed here. Notably, the processing means 602 and the storage unit 604 of the communication apparatus 60 may be implemented via hardware, software, or firmware, etc., though not limited thereto. Examples of hardware may include analog, digital and mixed circuits known as microcircuit, microchip, or silicon chip. Examples of the electronic system may include a system on chip (SoC), system in package (SiP) and a computer on module (COM).

Note that in the context of this disclosure, a machine readable storage medium or a non-transitory computer-readable medium stores programs for use by or in connection with a data processing system, apparatus, or device. In this regard, one example, among others, is a machine readable storage medium embodying a program executable in a data processing system such as the communication apparatus 60 in FIG. 6. In accordance with such examples, the program may be executed cause the data processing system to perform the process 40 or 50.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling transmission for a host in a data transmission system, the method comprising:
    establishing a connection with a device of the data transmission system via a first frequency;
    receiving a negotiating information from the device; and
    re-establishing the connection with the device via a second frequency when the negotiating information reveals that the second frequency is available for the host to communicate with the device;
    wherein the second frequency is lower than the first frequency;
    wherein a data transmission frequency between the device and the host is changed from the first frequency to the second frequency when interference signals are detected, the second frequency is a user-defined frequency different than the first frequency defined by an USB standard, and the interference signals are generated by a data transmission with the first frequency.

2. The method of claim 1, wherein the step of receiving the negotiating information from the device comprises:
    detecting interference signals around the first frequency; and
    notifying the device to transmit the negotiating information when a degree of the interference signals is greater than a threshold.

3. The method of claim 1, wherein the data transmission system is a universal serial bus (USB) system.

4. The method of claim 3, wherein the step of receiving the negotiating information from the device is performed during a training process of the USB system.

5. The method of claim 1, wherein the step of receiving the negotiating information from the device is performed after data is transmitted in the data transmission system.

6. The method of claim 1, further comprising:
    receiving another negotiating information related to a third frequency from the device when the second frequency is not available for the host to communicate with the device.

7. A method of handling transmission for a device in a data transmission system, the method comprising:
    establishing a connection with a host of the data transmission system via a first frequency;
    transmitting a negotiating information to the host; and
    allowing the host to re-establish the connection via a second frequency when the host is required to re-establish the connection via the second frequency according to the negotiating information;

wherein the second frequency is lower than the first frequency;

wherein a data transmission frequency between the device and the host is changed from the first frequency to the second frequency when interference signals are detected, the second frequency is a user-defined frequency different than the first frequency defined by an USB standard, and the interference signals are generated by a data transmission with the first frequency.

8. The method of claim 7, wherein the step of transmitting the negotiating information to the host comprises:

receiving a notification from the host when a degree of interference signals detected by the host is greater than a threshold.

9. The method of claim 7, wherein the data transmission system is a universal serial bus (USB) system.

10. The method of claim 9, wherein the step of transmitting the negotiating information to the host is performed during a training process of the USB system.

11. The method of claim 7, wherein the step of transmitting the negotiating information to the host is performed after data is transmitted in the data transmission system.

12. The method of claim 7, further comprising:

receiving a notification indicating that the second frequency is not available for the host to communicate with the device;

transmitting another negotiating information related to a third frequency to the host.

* * * * *